United States Patent [19]

Wolf et al.

[11] Patent Number: 5,042,923

[45] Date of Patent: * Aug. 27, 1991

[54] ADJUSTABLE TINT WINDOW WITH ELECTROCHROMIC CONDUCTIVE POLYMER

[75] Inventors: James F. Wolf, Dover; Granville G. Miller, Morristown; Lawrence W. Shacklette, Maplewood; Ronald L. Elsenbaumer, Morris Township, Morris County; Ray H. Baughman, Morris Plains, all of N.J.

[73] Assignee: Allied-Signal, Inc., Morristown, N.J.

[ * ] Notice: The portion of the term of this patent subsequent to Jan. 16, 2007 has been disclaimed.

[21] Appl. No.: 425,542

[22] Filed: Oct. 23, 1989

Related U.S. Application Data

[62] Division of Ser. No. 211,537, Jun. 27, 1988, Pat. No. 4,893,908.

[51] Int. Cl.⁵ .................. G02F 1/01; G02B 17/00; E06B 7/12
[52] U.S. Cl. ..................... 359/275; 359/591; 359/592; 52/171
[58] Field of Search ............... 350/357, 258, 259, 260, 350/261, 262; 52/171, 172

[56] References Cited

U.S. PATENT DOCUMENTS

| 4,613,211 | 9/1986 | Papir et al. | 350/357 |
| 4,893,908 | 1/1990 | Wolf et al. | 350/357 |
| 4,902,110 | 2/1990 | Green | 350/357 |

Primary Examiner—Eugene R. LaRoche
Assistant Examiner—Evelyn A. Lester
Attorney, Agent, or Firm—Ernest D. Buff; Gerhard H. Fuchs

[57] ABSTRACT

A method is provided for decreasing radiative heat transfer and adjustably limiting visible light and near infrared radiation transfer and glare through a window. The method comprises the steps of: (a) mounting within a frame of the window a plurality of spaced window panes, a first and second of the panes having opposing faces; (b) assembling between the opposing faces a conductive polymer cell, the cell having a first wall composed of a transparent conductive layer affixed to the first pane and having deposited thereupon an electroactive electro-optically responsive conductive polymer, and a second wall comprised of a transparent conductive layer coated on the second pane, the layer being optionally coated with a second electro-optically responsive polymer, the first and second walls delimiting a cavity containing an ion-conducting electrolyte which contacts opposing surfaces of the first and second walls, and (c) applying a potential between the first and second walls to provide a selected light transmittance upon passage of current therebetween.

22 Claims, 2 Drawing Sheets

ADJUSTABLE TINT WINDOW WITH ELECTROCHROMIC CONDUCTIVE POLYMER

This application is a division of application Ser. No. 211,537, filed 6/27/88, now U.S. Pat. No. 4,893,908 issued Jan. 16, 1990.

BACKGROUND OF THE INVENTION

This invention relates to the use of a conductive polymer material to selectively control light transmission through a transparent or semitransparent panel or film, and more particularly to the use of a conductive polymer material to provide a window shade of adjustable transmittance. Such a device may be embodied as a flexible adhesive-backed laminated plastic sheet, or as an integral part of a multiple-pane thermal insulating window panel.

Thermal-pane windows conventionally make use of spaced multiple (two or more) panes to provide a thermal barrier restricting heat conduction between the outside and the inside of a building and therefore tending to reduce heating and cooling costs. To further reduce cooling costs, window shades or blinds are used to block out intense, direct rays of sunlight, since conventional windows, insulating or otherwise, have little effect on radiative heating. However, in using a conventional shade to eliminate solar glare, the view to the outside is blocked, which may be considered a visually unattractive result. U.S. Pat. No. 4,268,126 discloses a multi-pane window unit that uses an electrooptical shade as an integral part of a thermal pane window. Such a device relys on diffuse reflection of light rays to provide mainly privacy. The effectiveness of such a window to control radiative heating (solar energy) is limited by the ability of the window device to reduce transmitted radiation by mainly diffuse scattering and not by optical absorption. Devices listed in U.S. Pat. No. 4,268,126 typically reduce solar radiative heating by up to 15%.

Thus, there exists a need for a window unit which includes an electrooptical device as an integral part of a thermopane window that provides a broad adjustable range of coherent light transmittance in both the visible and near-IR region of the electromagnetic spectrum. Such a window device which relies on absorption rather than diffuse reflectance can be used to control glare and the degree of radiative heating from sun rays while not blocking or obscuring the view from the outside.

The present invention makes use of conductive polymer material to provide adjustable control of the intensity of light transmission through a multi-pane thermal window unit or in automobile or aircraft windows or mirrors where adjustable light transmission is desired. The room occupant may select the degree of light transmittance of the shade, thus eliminating glare and the adverse effect on cooling requirements from direct rays of the sun, while not blocking the view to the outside.

Conjugated backbone polymers, e.g., polyacetylene, polyphenylene, polyacenes, polythiophene, poly(phenylene vinylene), poly(thienylene vinylene), poly(furylene vinylene), polyazulene, poly(phenylene sulfide), poly(phenylene oxide), polythianthrene, poly(isothianaphthene), poly(phenylquinoline), polyaniline, and polypyrrole, and the like have been suggested for use in a variety of electronic applications based upon their characteristic of becoming conductive when oxidized or reduced either chemically or electrochemically. Electrodes composed of such polymers can, according to the method of MacDiarmid et al. in U.S. Pat. No. 4,321,114, be reversibly electrochemically reduced to an n-type conductive state (the polymer being inserted by cations) or reversibly oxidized to a p-type conductive state (the polymer being inserted by anions).

The electrochemical oxidation or reduction process is generally recognized to be accompanied by sharp changes in the color of the polymer as well as its optical absorption coefficient (its ability to transmit light). Electrochromic devices based on conductive polymers have been described for example by F. Garnier et al. in J. Electroanal. Chem. 148, 299 (1983), by K. Kaneto et al. Japan J. Appl. Phys 22, L412 (1983), and by T. Kobayashi et al., J. Electroanal. Chem. 161, 419 (1984).

SUMMARY OF THE INVENTION

The present invention provides an electro-optical shade of adjustable light transmittance as an integral part of a multi-pane thermal window unit or as a free standing flexible plastic laminate which may be applied within laminated sheets of glass for automotive and other applications, or which may be applied to the surface of an existing window or mirror.

Advantageously, the thermal window unit is resistant to radiative heating and conductive heat transfer between the exterior and interior. Preferably, it consists of substantially parallel, spaced window panes, mounted in a window frame, a first of the panes having affixed thereto the first wall of an electro-optical conductive polymer cell providing a selected light transmittance, and a second of said panes delimiting, with a second wall of said cell a space providing a thermal break. When the device is included as an integral part of a glass laminate, the advantage of an adjustable tint is obtained from varying the amount and polarity of direct current applied. The transmission of both visible and near-infrared radiation can be adjusted.

The term "electro-optical conductive polymer cell" as used hereinafter is intended to means a device consisting of two electrodes with an electrolyte in between, and at least one of such electrodes comprising an electrochromic conductive polymer. The conductive polymer material being electro-optically responsive to an applied voltage between the electrodes, such that light transmittance through the conductive polymer material is selectable depending upon the polarity of the applied potential and the charge passed through the cell. Additionally, the "electro-optical conductive polymer cell" can contain transparent or semitransparent electrically conductive layers in contact with the electrodes, sealant or adhesive layers, support layers comprised, in one embodiment of the invention, of a plurality of walls of transparent film having sufficient supporting strength to maintain the structural integrity of the cell; binders; and polarizer elements, as discussed hereinafter in more detail.

As used herein the term "pane" means a transparent or semitransparent, inorganic or organic material having mechanical rigidity and a thickness greater than about 24 microns.

The term "electrically conductive layer" as used herein means a layer or sequence of layers containing an electrically conductive material which is chemically inert during the operation of the cell. The electrically conductive layer can consist of a thin semitransparent conductive film of uniform or of nonuniform thickness or of a sheet-like array of substantially parallel or antiparallel wires.

The window unit may further comprise a window frame means for securing the mutual orientation of a plurality of transparent, nonintersecting or, preferably, substantially parallel, sequentially spaced panes and for sealing and isolating a space therebetween; a first transparent pane mounted in the window frame means in a position toward an interior facing side of said frame means; a second transparent pane, nonintersecting with and, preferably, substantially parallel to and spaced from said first pane, mounted in said frame means in a position toward an interior facing side of said frame means; a conductive polymer cell comprising in a preferred configuration a first wall composed of a semitransparent electrically conductive layer in contact with an electrode, a second wall composed of a transparent or semitransparent electrode and an electrolyte disposed between opposing faces of said first and second walls, at least one of said electrodes being electro-optically responsive. Said first wall of said cell being affixed to one of the opposing faces of said first and second panes and said second wall of said cell being affixed to the second pane or for a thermal window delimiting with the other opposing face of said first and second panes a space providing a thermal break; and an electrical means for applying a potential between said conductive layers and said electrodes of a selected strength at least sufficient to change the optical transmission of said conductive polymer material.

The invention further provides a method for decreasing radiative heating and conductive heat transfer between the exterior and the interior of the building, comprising the steps of: mounting within a window frame a plurality of spaced window panes, a first and second of said panes having opposing faces; affixing to one of the opposing faces a first wall of a conductive polymer cell, said first wall being composed of a transparent electrically conductive layer coated with an electro-optically responsive polymer and cooperating with a second wall composed of a transparent electrically conductive layer and, optionally, coated with an electroactive material such as an electro-optically responsive polymer, to form a cavity containing an ion conducting electrolyte in contact with opposing faces of the first and second walls; applying a potential between said first and second walls to provide a selected light transmittance upon passage of a current therebetween; and, optionally, delimiting between said second wall of said cell and the other of said opposing faces of said panes a space providing a thermal break.

Advantageous structural features are provided by the method and means of this invention. The conductive polymer cell may be readily produced as film on rolls for application to the sizeable area provided by either opposing face of the panes. Once applied, a thermal break is achieved without need for more than two panes of glass. The size, weight, and the cost of the window unit is markedly reduced, manufacturing procedures are simplified and the reliability and operating efficiency of the unit are increased.

The panes may be light polarizing to further reduce glare from direct sunlight or to increase the efficiency of the polymer cell where the electrochromic polymer can be also polarized and oriented horizontally to limit glare or at 90° with respect to an additional polarizing element to provide enhanced optical absorption characteristics. An inert gas may be injected into the space delimited between the second wall of the cell and an opposing face of a pane, or the space may be evacuated to the extent practical to enhance thermal conductivity break characteristics.

BRIEF DESCRIPTION OF THE DRAWINGS

The invention will be more fully understood and further advantages will become apparent when reference is made to the following detailed description of the preferred embodiment of the invention and the accompanying drawings in which.

DETAILED DESCRIPTION OF THE INVENTION

Figure 1:
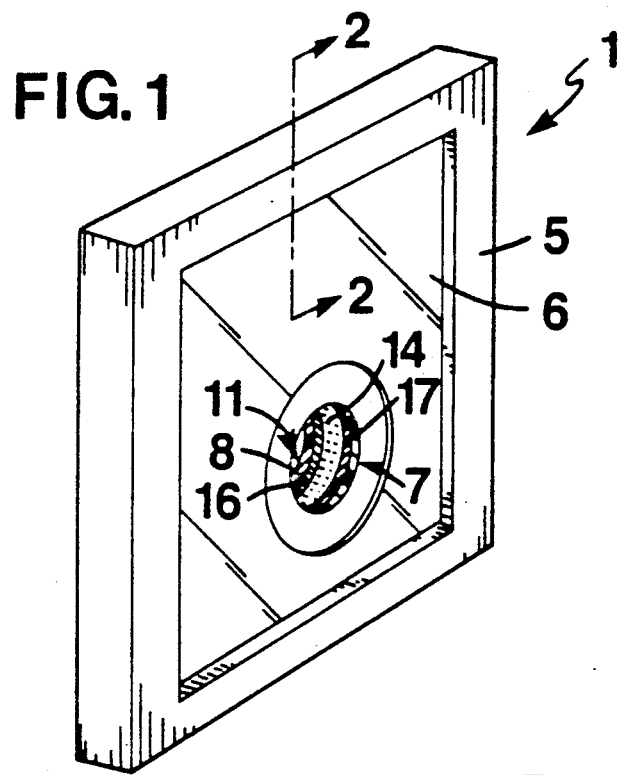
FIG. 1 is a perspective view of a multi-paned window of the present invention in a typical frame.
Figure 2:
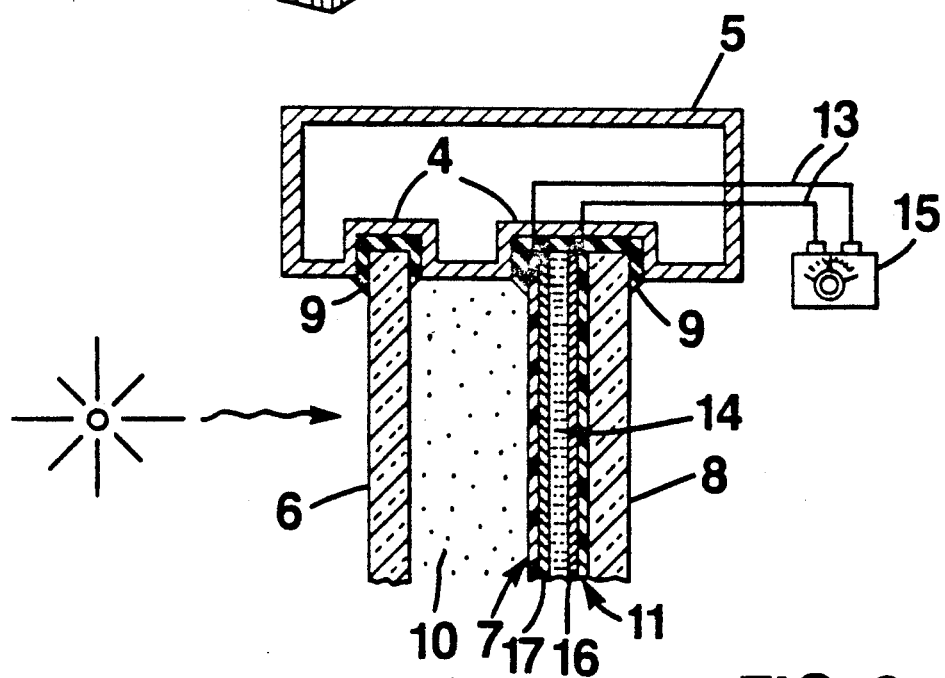
FIG. 2 is a cross-sectional view taken along line 2—2 of FIG. 1, showing a thermal barrier space between a wall of the electro-optical conductive polymer cell and an opposing face of a pane.

Referring specifically to the drawings, in FIG. 1 there is shown a window unit 1 having two non-intersecting and, preferably, substantially parallel, spaced transparent panes 6 and 8 mounted in a conventional frame 5. A cross-sectional view taken along the line 2—2 in the direction indicated by the arrows is shown in FIG. 2.

Transparent panes 6 and 8 are mounted in channels 4 of frame 5 with a conventional semi-rigid sealant 9, such as butyl rubber, so that the panes are non-intersecting and, preferably substantially parallel and spaced. The sealant aids in securing the mutual orientation of the panes. The window unit is mounted in a window opening of a wall structure so that the pane 6 is the outside pane and pane 8 is the inside pane. Panes 6 and 8 and the space 10 constitute the thermalpane portion of the embodiment wherein space 10 provides a thermal barrier significantly restricting the conduction of heat through the window. Frame 5 is shown as being hollow, by way of example, to restrict peripheral heat conduction and may be an extruded aluminum alloy. To enhance the thermal barrier effect, space 10 may be evacuated to the extent practical, or filled with an inert gas selected from the group consisting of argon, nitrogen, dry air, neon and mixtures thereof. Use of an inert gas, such as argon, inside of the thermal pane can be usefully employed to prevent corrosion or oxidative degradation of the conductive polymer cell, polarizer elements, and adhesive window components.

Affixed to one of the opposing faces of panes 6 and 8 by means of a suitable adhesive is a first wall 11 of an electro-optical conductive polymer cell. A variety of adhesives can be conveniently utilized. Preferably the adhesive should thoroughly wet and evenly coat the surface of the pane and the opposing face of the polymer cell, so as to ensure proper bonding and the elimination of spurious void spaces which can scatter light and interfere with sound mechanical adhesion. Also, the set adhesive is preferably colorless and either amorphous or microcrystalline with a crystallite size much smaller than the wavelength of light, so that negligible light scattering or absorption of light occurs at the adhesive interface. Adhesives found especially suitable for this purpose are certain polyvinylacetate adhesives, or cyanoacrylate adhesives and the like. Wall 11 is composed of a transparent, electrically conductive film, such as tin oxide deposited on a transparent film composed of glass or plastic such as polymethylmethacrylate, polycarbonates and the like. Wall 11 is coated with a thin layer of electro-optical responsive polymer 16 and cooperates with a second wall 7 composed of transparent, electrically conductive film having the composition of wall 11 and, optionally, coated with an electro active material 17 such as an electro-optically responsive polymer, a transition metal oxide or the like, to form a cavity containing a liquid or solid electrolyte material 14. Electrical leads 13 connect the first and second walls 11 and 7 (which constitute electrodes) to a variable d.c. current supply 15. The electrolyte material 14 fills substantially the entire volume of the cavity. Typically, the distance between opposing faces of walls 11 and 7 is about 1–20 mil (25–500.0 microns).

Conductive polymers are intended for use as the primary electrochromic substance of which one or both electrodes are comprised. These polymers may be either anion inserting (p-type) or cation inserting (n-type). Oxidized (p-type) conductive polymers are preferred.

Suitable anion inserting (p-type) polymers include oxidized polyacetylene, poly(p-phenylene), polyacene, polyperinaphthalene, poly(phenylene vinylene), poly(thienylene vinylene), poly(furylene vinylene) polyazulene, polynaphthalene, poly(phenylene sulfide), poly(phenylene oxide), polyphenothiazine, polyaniline, polypyrrole, polythiophene, polythianthrene, polyisothianaphthene and substituted versions of the above. Such polymers may be coated by reaction, when oxidized, with pyrroles, thiophenes, azulenes, oxiranes, anilines or furans, as described in commonly-assigned U.S. Pat. No. 4,472,987, the disclosure of which is incorporated herein by reference.

Among the above listed polymers, those which are substantially transparent and colorless in either their oxidized or neutral states (but not both) are preferred. These preferred polymers include polyaniline in the form referred to as poly(phenylene amine) and polypyrrole which are transparent in their neutral state, and poly(alkoxythienylene vinylene) and polyisothianaphthene which are substantially transparent in their oxidized state. Most preferred are poly(phenylene amine) and poly(alkoxythienylene vinylene).

Suitable cation inserting (n-type) polymers include poly(p-phenylene), polyacetylene, poly(p-phenylene vinylene), and poly(phenylquinoline) which are preferred. Most preferred is poly(phenylquinoline) and its substituted derivatives.

Polymers suitable for this invention may also contain electrochromic substituent groups such as viologens and the like to enhance the intensity of the changes in optical and infrared absorption.

Since it is critical that the device of this invention be capable of a large number of cycles between states of varying transmissiveness, the device must be provided with two electrodes at which fully reversible electrochemical reactions occur. These electrodes must be separated by a solid or liquid electrolyte which is ionically conductive but electrically insulating. The components of this electrolyte must in general be electrochemically inert but there may be certain embodiments that contain species which undergo reversible reactions at one or both electrodes.

While only one of the two electrodes of the electro-optical cell need be composed of an electrochromic material, advantage in contrast and efficiency is obtained if both electrodes operate in tandem. In this case, a given polarity of the voltage applied to the cell causes both electrodes to become simultaneously deeply colored or absorbing in the visible or infrared or both. The opposite polarity applied to the cell causes both electrodes to become optically transmissive in the visible or infrared or both. The efficiency of the device is further improved by orienting the polymers 16 and 17 on their supports (11, and 7 in FIGS. 2,3) such that the polymer chain orientation of opposing electrodes differs by 90°. Cross-polarization then further limits the transmission of light when the polymers are in their absorbing state. The polymers can be oriented to achieve a polarization of light by drawing of the substrate (for a polymer substrate) after the conductive polymer is deposited, by grooving the substrate prior to deposition, by imposing a shear during electrochemical polymerization or by other chain orientation methods.

We can arbitrarily classify materials for the electro-optical cell as anode or cathode materials based on their becoming transmissive during an anodic or cathodic process, respectively. That is, an anode material is defined as a material that becomes transmissive during an oxidation process and becomes optically absorbing during a reduction process. The reverse would apply for a cathode material.

Tables 1 and 2 list a number of anode and cathode materials useful for the construction of the electro-optical cell of this invention. In a preferred embodiment, one electrode would be composed of a material from Table 1 and the opposing electrode would be composed of a material from Table 2. In these preferred embodiments, the device in its visibly transmissive state would be substantially colorless (with very light blue, green or yellow tint). Other polymers included in the broad description of useful polymers could be employed for devices designed to provide distinct color transformations such as blue to red or green to red along with changes of transmitted light intensity.

TABLE 1

| Materials for Use as the Anode[a] | | |
|---|---|---|
| Materials | Film Preparation Method[b] | Redox State of Colored Form |
| poly(alkoxythienylene vinylene) | SC | neutral |
| polyisothianaphthene | E | neutral |
| Tungsten bronze (WO3) | CVD | reduced (cation-inserted) |
| Molybdenum bronze (MoO3) | CVD | reduced (cation-inserted) |
| poly(phenylquinoline) | SC | reduced (cation-inserted) |
| poly(p-phenylene) | E | reduced (cation-inserted) |
| polyacetylene | P | neutral |

[a]Materials which become transmissive during an anodic process (oxidation)
[b]E = electrochemical polymerization SC = solution cast CVD = chemical vapor deposition p = direct chemical polymerization onto substrate

TABLE 2

| Materials for use as the Cathode[a] | | |
|---|---|---|
| Material | Film Preparation Method[b] | Redox State of Colored Form |
| poly(phenylene amine) | E,SC | oxidized (anion-inserted) |
| polypyrrole | E | oxidized (anion-inserted) |
| poly(p-phenylene vinylene) | SC | oxidized (anion-inserted) |

TABLE 2-continued

| | Materials for use as the Cathode[a] | |
|---|---|---|
| Material | Film Preparation Method[b] | Redox State of Colored Form |
| polyacetylene | P | neutral polymer |

[a]Materials which become transmissive during a cathodic process (reduction).
[b]E-electrochemical polymerization SC = solution cast P = direct polymerization onto substrate It is also possible to construct an electro-optical cell using only one of the materials from either Table 1 or Table 2. One of the electrodes would then be composed of a continuous film of a conductive polymer and the opposing electrode would either be composed of narrow strips of the same polymer or of a largely transparent conductive material which does not appreciably change its optical absorption characteristics but which provides a substrate for, or itself undergoes a reversible electrochemistry. In this embodiment, an electroactive species might be included in the electrolyte. Such species include $FeSO_4$. When such an electroactive species is included in the electrolyte a semipermeable or selective diffusion barrier might be provided between the two electrodes to improve the stability.

The solvents which may be included in the electrolyte of the electro-optical cells of the present invention may vary widely and can be organic solvents or aqueous solvents normally used for electrochemical oxidations or reductions. Preferably, these solvents should be electrochemically inert to oxidation and reduction during use while simultaneously being capable of dissolving the desired salt at a concentration of preferably about 0.1M and more preferably about 1M, capable of wetting the polymer, and providing an ionic conductivity about equal to or in excess of about $10^{-5}$ S/cm, preferably about equal to or greater than about $10^{-4}$ S/cm more preferably about $10^{-3}$ S/cm. Examples of such useful solvents include propylene carbonate, ethylene carbonate, sulfolane, methylsulfolane, butrolactone, dimethylsulfolane, 3-methyl-2-oxazolidone, alkane sultones, e.g., propane sultone, butane sultone, dimethyl sulfoxide (DMSO), dimethyl sulfite, acetonitrile, benzonitrile, methyl formate, methyltetrahydrofurfuryl ether, tetrahydrofuran (THF), 2-methyltetrahydrofuran (2-MTHF), dioxane, dioxolane, 1,2-dimethoxyethane (DME), dimethoxymethane, diglyme and glymes, and water. Mixtures of such available organic solvents may also be used, such as mixtures of sulfolane and dimethoxyethane, or mixtures of propylene carbonate and dimethoxyethane, or mixtures of water and acetonitrile, benzonitrile and aqueous perchloric acid, acetone and water, and the like.

The solvents chosen for use in any particular situation will, of course, depend upon many factors such as the precise electrolyte composition used and the voltage range desired as well as the choice of electrodes and other components.

In a preferred embodiment, the solvent may also be replaced by a polymer which is capable of conducting ions. Such polymers include those in which an acid, base, or salt may be dissolved to form an ion conducting medium. These polymers include but are not restricted to poly(vinyl alcohol), poly(ethylene oxide), poly(propylene oxide), polysiloxane, poly(alkoxyphosphazines), and mixtures thereof.

Also included are polymers which form gels with or may be swollen by aqueous or nonaqueous solvents. Such polymers may vary widely and include polyacetates, poly(vinylalcohol) polydiacetylenes, polyethylene, and the like, and copolymers or terpolymers such as ethylene-propylene-diene terpolymer (EPDM).

Salts for use in the electro-optical device of this invention may vary widely but must be ionizable in the solvent chosen and must provide suitable counterions for the oxidized or reduced conductive polymers employed as electrochromic materials.

In the case of oxidized (p-type) conductive polymers the anion of the salt must be capable of insertion into the polymer during oxidation without decomposition. Suitable anionic species include $I^-$, $I^-_3$, $Br^-$, $Cl^-$, $ClO_4^-$, $PF_6^-$, $BF_4^-$, $AlCl_4^-$, $FeCl_4^-$, $HF_2^-$ fluorinated organoborates, and organofluoroborates, such as $B(p-FC_6H_4)-_4$ and $B(C_6F_4)_4^-$, sulfonates, such as $CF_3SO^-_3$, $CF_3(C_6H_4)SO_3^-$, $C_6H_5SO_3^-$ and $CH_3(C_6H_4)SO_3^-$, $POF_4^-$, $CN^-$, $SCN^-$, $CF_3CO_2^-$ (trifluoroacetate), $C_6H_5CO_2^-$(benzoate), $HSO_4^-$ and the like.

In the case of reduced (n-type) conductive polymers the cation of the salt must be capable of insertion into the polymer during reduction without decomposition. Suitable cationic species include $Li^+$, $Na^+$, $K^+$, $Rb^+$, $Cs^+$, alkylammoniums such as $(CH_3)_4N^+$, $(C_2H_5)_4N^+$, $(C_3H_7)_4N^+$, $(C_4H_9)_4N^+$, $(CH_3)(C_3H_7)_3N_+$, as well as sulfonium and phosphonium analogs and the like, and cyclic ions such as pyridinium, imidazolium, and the like. Particularly preferred are the alkali-metal ions.

For devices which contain only p-type or only n-type polymers, the ion that remains in solution and which is not inserted must be inert to oxidation and reduction, respectively. Preferred anions for use in the presence of reduced polymers are $PF_6^-$, alkylborates and arylborates (U.S. Pat. No. 4,522,901), and halides. Preferred cations for use in the presence of oxidized conductive polymers are the alkali-metal ions, protons, and silver ions.

Room-temperature molten salts may also be useful as electrolytes in the present invention. Such salts include alkylimidazolium tetracholoraluminates (the use of which for the oxidation and reduction of conductive polymers is described in U.S. Pat. Nos. 4,463,071 and 4,463,072), alkylpyridinium tetrachloroaluminates, and mixtures of the above with alkali-metal halides.

Figure 3:
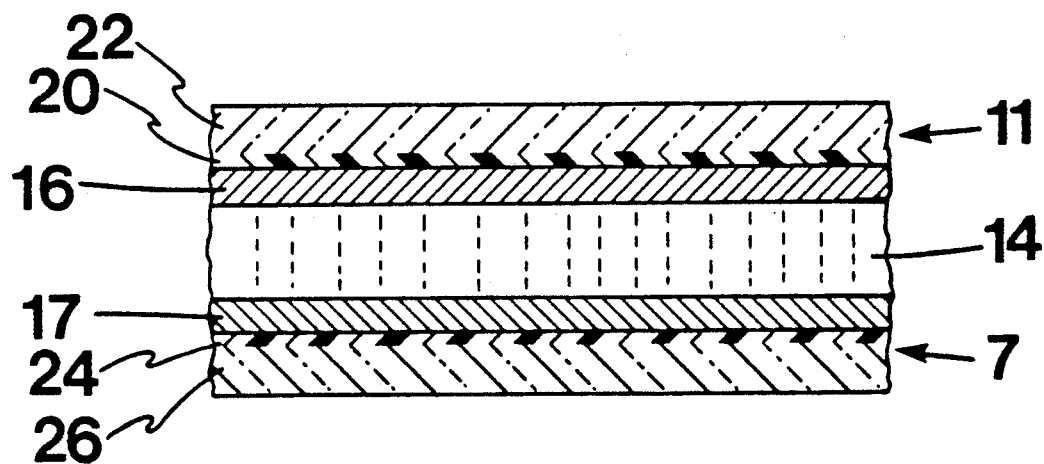
FIG. 3 is a sectional view showing the details of the electro-optical conductive polymer cell.

A variety of transparent conductors, such as $SnO_2$, $InO_3$ and $Cd_2SnO_4$ and the like, can be used for the conductive surface on walls 7 and 11 (see FIGS. 2 and 3). Examples of commercial compositions for such conductors are transparent metal oxides made by Deposition Technology and Sierracin/Intrex using sputtering techniques involving reactive gases in combination with metal targets. Leybold-Heraeus also offers commercially a metal/metal oxide coating called TCC 2000 which is sufficiently transparent and conductive for the present application.

EXAMPLES OF THE INVENTION

Example 1

Poly(phenylene amine) electrodes were fabricated by electrochemically oxidizing acidic aqueous solutions of aniline. A solution containing 0.5M aniline, 0.5M $NaHSO_4$, and 0.6M $H_2SO_4$ was found to be preferred over solutions containing $Cl^-$ or $CH_3SO_3^-$ anions in place of $HSO_4^-$. Galvanostatic deposition of the polymeric film on ITO conducting glass (a glass, D, coated with an indium-tin oxide conductive layer, E, in FIG. 1) was accomplished by imposing a constant current of 0.35 mA/cm² between the ITO electrode and a nickel screen counter electrode until a total charge of 70 mC/cm² had passed. This procedure produced a very uniform, adherent film of electrooptic polyphenylene amine on the ITO glass.

Example 2

A window containing an electro-optical cell was assembled as in FIG. 1 from an electrode with a poly(phenylene amine) deposit as described in Example 1 and a second piece of ITO conducting glass separated by a spacer of an inert material, teflon, with the intervening space being filled with a liquid electrolyte solution of 1.0M $H_2SO_4$. When a cathodic current was applied to the electrode with the poly(phenylene amine) deposit the window become highly transmissive. When an anodic current was applied to the electrode with the polymeric deposit the window became highly absorbing with a dark green-blue coloration.

Example 3

A window containing an electro-optical cell was assembled as in Example 2 except that the electrolyte was a gel consisting of a 20 wt % aqueous solution of poly(vinyl alcohol) and 1.1M $H_3PO_4$. When a cathodic current was applied to the electrode with a poly(phenylene amine) deposit the window became transmissive. When an anodic current was applied to the electrode with the polymeric deposit the window became highly absorbing. Repeated cycling, however, caused a brownish discoloration of the window which was found to be caused by the lack of a reversible couple at the electrode composed only of ITO glass.

Example 4

A window was assembled as in Example 3 except that the gel electrolyte contained ferrous sulfate (1 mM) and ferric sulfate (1 mM), an electrochemically reversible couple which moderated the cell voltage and served as a substrate to take up and release charge as the polymeric electrode was being charged. When a cathodic current was applied to the electrode with the poly(phenylene amine) deposit, the window became transmissive. When an anodic current was applied to the electrode with the polymeric deposit the window became highly absorbing. Repeated cycling was achieved without the discoloration observed in Example 3.

Example 5

A window was assembled as in Example 3 except that the electrolyte was a solid transparent film made by applying a 20 wt. % aqueous solution of poly(vinyl alcohol) and 1.1M $H_3PO_4$ to the electrode having the polymeric deposit of poly(phenylene amine) and evaporating the water at 35° C. for 24 hours. When a cathodic current was applied to the electrode with the poly(phenylene amine) deposit the window become transmissive. When an anodic current was applied to the electrode with the polymeric deposit the window became highly absorbing.

We claim:

1. A window unit having an electro-optical shade of adjustable light transmittance comprising:
    (a) window frame means for securing the mutual orientation of a plurality of transparent, substantially parallel, sequentially spaced panes;
    (b) a first transparent pane mounted in said window frame means in a position toward and interior facing side of said frame means;
    (c) a second transparent pane substantially parallel to and spaced from said first pane, mounted in said frame means in a position toward an interior facing side of said frame means;
    (d) a conductive polymer cell comprising a first wall composed of a semitransparent electrically conductive layer in contact with an electrode comprising an electroactive electro-optically responsive conductive polymer composed of either p-type (anion inserted) or n-type (cation inserted) conjugated polymers, a second wall composed of a transparent or semitransparent electrode optionally comprising a second electro-optically responsive conductive polymer, said conjugated polymers being chain oriented in a plane parallel to the plane of the window so as to create a polarization of the transmitted light, and an electrolyte disposed between opposing faces of said first and second walls;
    (e) said first wall of said cell being affixed to one of the opposing faces of said first and second panes; and
    (f) electrical means for applying a potential between said conductive layers and said electrodes of a selected strength at least sufficient to change the optical transmission of said conductive polymer.

2. A window unit as recited in claim 1, further comprising a third pane mounted in said window frame means and delimiting, with said first or second panes, a space providing a thermal break.

3. A window unit as recited in claim 2, comprising sealing means for sealing isolating said space.

4. A window unit as recited in claim 3, wherein said space has disposed therewithin an inert gas to enhance thermal break characteristics.

5. A window unit as recited in claim 4, wherein said inert gas is selected from the group consisting of argon, nitrogen, dry air, neon and mixtures thereof.

6. A window unit as recited in claim 1, wherein said p-type conjugated polymers are coated on said first wall and are adapted to become transmissive during a reductive or cathodic process.

7. A window unit as recited in claim 1, where said p-type conjugated polymers are coated on the second wall and are adapted to become transmissive during an oxidative or anodic process.

8. A window unit as recited in claim 1, in which said p-type conjugated polymers are chosen from poly(thienylene vinylene), poly(furylene vinylene), poly(isothianaphthene), polyacetylene, and substituted versions thereof.

9. A window unit as recited in claim 8, in which said poly(thienylene vinylene) is substituted in the 3 position by a methoxy, propoxy, butoxy, hexoxy, or octyloxy group.

10. A window unit as recited in claim 1, wherein said n-type conjugated polymers are coated on said second wall.

11. A window unit as recited in claim 10, wherein the n-type conjugated polymer is chosen from polyacetylene, poly(p-phenylene), poly-2,6-(4-phenylquinoline), and substituted versions thereof.

12. A window unit as recited in claim 1, wherein said second electro-optically responsive material is coated on said second wall as an electroactive material, and is adapted to become transparent during an oxidative or anodic process.

13. A window unit as recited in claim 12, wherein said second electro-optically responsive material is a tungsten bronze or a molybdenum bronze.

14. A window unit as recited in claim 13, wherein said bronze is applied to the conductive layer of claim 1 as a substantially amorphous film.

15. A window unit as recited in claim 1, wherein the plane of polarization is chosen to be horizontal with the ground and substantially eliminates glare.

16. A window unit as recited in claim 1, wherein the conductive polymers applied to each of said first and second walls are respectively chain oriented in perpendicular directions so as to effect a cross polarization of transmitted light.

17. A window unit as recited in claim 1, wherein said electrolyte is composed of an ionizable salt dissolved in a liquid solvent.

18. A window unit as recited in claim 1, wherein said electrolyte is composed of a solid polymeric electrolyte.

19. A window unit as recited in claim 18, wherein the polymeric electrolyte is composed of a mixture of phosphoric acid and poly(vinylalcohol).

20. A window unit as recited in claim 18, wherein the polymeric electrolyte is composed of a mixture of an alkali-metal salt and a saturated polyether or other backbone polymer having polyether side groups.

21. A window unit as recited in claim 1, wherein the transparent conductive layer of the first and second walls is composed of indium-tin oxide, antimony-tin oxide or cadmium-tin oxide.

22. A window unit as recited in claim 1, wherein the opposite face of the pane forming the first and second wall is covered by a reflecting coating to form a mirror providing an adjustable degree of reflection.

* * * * *